(12) United States Patent
Polak et al.

(10) Patent No.: US 7,051,375 B2
(45) Date of Patent: May 30, 2006

(54) WETSUIT AND WETSUIT MATERIAL

(75) Inventors: Joseph P. Polak, Seaville, NJ (US);
Allan G. Edmund, Northfield, NJ (US)

(73) Assignee: Henderson Aquatics, Inc., Millville, NJ (US)

( * ) Notice: Subject to any disclaimer, the term of this patent is extended or adjusted under 35 U.S.C. 154(b) by 0 days.

(21) Appl. No.: 10/953,331

(22) Filed: Sep. 29, 2004

(65) Prior Publication Data

US 2005/0071905 A1    Apr. 7, 2005

Related U.S. Application Data

(60) Provisional application No. 60/509,124, filed on Oct. 6, 2003.

(51) Int. Cl.
*A41D 13/12*    (2006.01)

(52) U.S. Cl. .............................................. 2/82; 2/2.15

(58) Field of Classification Search .................. 2/2.16, 2/2.15, 82; 442/85, 293, 30, 37, 45, 86, 223, 442/315, 370, 399, 418–151; 428/190, 304.4, 428/308.4, 309.9, 316.6, 318.8, 319.3, 354, 428/121, 147, 124–130, 167, 172, 181, 189, 428/192, 193, 196
See application file for complete search history.

(56) References Cited

U.S. PATENT DOCUMENTS

| 4,205,559 | A  | * | 6/1980 | Long et al. ................. 474/271 |
| 4,351,872 | A  | * | 9/1982 | Brosseau et al. ........... 428/198 |
| H001104   | H  | * | 9/1992 | Cavanagh ................... 442/111 |
| 5,646,076 | A  | * | 7/1997 | Bortz .......................... 442/136 |
| 6,541,094 | B1 | * | 4/2003 | Landvik et al. ............... 428/71 |

FOREIGN PATENT DOCUMENTS

JP    2003-558800 A   *   8/2001

* cited by examiner

*Primary Examiner*—John J. Calvert
*Assistant Examiner*—Andrew W. Sutton
(74) *Attorney, Agent, or Firm*—Howson and Howson

(57) ABSTRACT

A wetsuit is composed multiple panels sewn together in edge-to-edge relationship, each panel comprising a highly stretchable base fabric sandwiched between an outer and inner layer of synthetic rubber, the outer synthetic rubber layer is dense and tough, providing protection against damage by abrasion, while the inner synthetic rubber layer is thicker and less dense, providing the material with a good insulating ability. The outer layer is thinner than the inner layer to compensate for the higher elastic modulus of the denser outer layer, so that the layers stretch uniformly. A thin, colored, chloroprene adhesive coating is provided on the outside of the outer layer, and the outer layer is embossed with a mesh pattern. The seams are blind-stitched through the base fabric from the outside. Because the stretchable fabric is on the inside of the wetsuit material, the wetsuit dries rapidly.

21 Claims, 2 Drawing Sheets

WETSUIT AND WETSUIT MATERIAL

CROSS REFERENCE TO RELATED APPLICATION

This application claims priority from provisional application No. 60/509,124, filed Oct. 6, 2003.

FIELD OF THE INVENTION

This invention relates to wetsuits, that is, exposure suits, for diving and aquatic sports, and more particularly to an improved wetsuit material.

BACKGROUND OF THE INVENTION

A conventional wetsuit is typically composed of a foamed synthetic rubber layer, usually neoprene, covered on both faces by layers of fabric, usually woven or knit from yarns composed of a nylon/lycra blend. The fabric layers absorb significant quantities of water, and drying a wetsuit after use is a frustrating and inconvenient process. It commonly takes up to eight hours or longer for the external fabric layer to dry completely. Many divers dry their suits in the sun to speed up the drying process. However in doing so, they risk damage to their suits due to exposure to ultraviolet radiation. Others have attempted to machine dry their suits. However wetsuits are not capable of withstanding dryer temperatures, and are seriously damaged by machine drying. Wetsuit manufacturers warn against machine drying and limit their warranties accordingly.

The proper drying technique is to hang the suit in the shade for a long period of time until the suit is completely dry. However, drying a wetsuit in this manner is not practical, especially since most wetsuit use is by sport divers who are traveling. Packing a wet exposure suit in luggage is never convenient. Moreover, many vacationers' wetsuits are stolen when hung out to dry overnight. In the case of live-aboard diving from a boat, finding an suitable space to hang a suit is often impossible.

Another problem encountered in the case of a conventional wetsuit, is that the outer fabric layer is subject to deterioration due to abrasion. This deterioration is characterized by pilling, and is a major source of complaint by wetsuit users.

BRIEF SUMMARY OF THE INVENTION

An object of this invention is to provide a wetsuit that dries rapidly, thereby eliminating the problem of ultraviolet and high temperature damage, the problem of packing a suit in luggage while it is still wet, the problem of finding a suitable drying space on a boat, and the problems of theft, fabric deterioration and pilling. Another object of the invention is to provide a rapid-drying wetsuit that resists damage to its exterior surface by abrasion, but which exhibits stretch characteristics comparable, or superior, to those of conventional wetsuits.

The wetsuit material in accordance with the invention comprises a base fabric sandwiched between first and second layers of synthetic rubber, each layer having a substantially uniform thickness. The first layer has an elastic modulus and density greater than the elastic modulus and density, respectively, of the second layer, and the first layer is thinner than the second layer. Preferably, the ratio of the thicknesses of the first and second layers is approximately the inverse of the ratio of their elastic moduli, so that both synthetic rubber layers of the wetsuit material stretch uniformly, neither interfering with or impairing the stretching of the other.

The first synthetic rubber layer has an inner face adhesively secured to the base fabric, and an outer face coated with a thin, hydrophobic layer. The hydrophobic layer is preferably a cured chloroprene adhesive, and should have a thickness not greater than approximately 10 microns, preferably about 5 microns.

The outer face should be embossed with a pattern, preferably a mesh pattern giving the outer face an appearance as if it included a woven fabric. The embossed pattern prevents the outer surface of the wetsuit material from being excessively slippery, so that the friction between the outer face and objects in contact with it is increased.

The inner synthetic rubber layer preferably has an interior-facing, low-friction, hydrophobic, anti-microbial coating on its inner surface.

In the wetsuit, adjoining panels are sewn together in edge-to-edge relationship, preferably by blind-stitched threads passing over the outer surfaces of adjoining panels and across the adjoining edges thereof, then through the outer layer and base fabric of one of the panels into its inner layer, then into the inner layer in the other panel, and back through the base fabric and outer layer, without passing through the interior facing surfaces of either panel.

The wetsuit material in accordance with the invention decreases the wetsuit's drying time from hours to minutes while improving warmth, durability, comfort and ease of use.

The base fabric, which is preferably a high-stretch nylon/lycra blend, contributes to the strength and durability of the wetsuit material, but is isolated from water by the inner and outer synthetic rubber layers. Elimination of the exterior fabric avoids retention of water, enabling the material to dry rapidly, and also eliminates the problem of pilling and exterior fabric damage due to abrasion, ultraviolet exposure, and other causes.

The dense outer layer of synthetic rubber, resists damage due to abrasion, while the less dense inner layer contributes to the warmth afforded by the wetsuit. Both layers protect the base fabric from contact with water. Because the outer layer of synthetic rubber is thinner than the inner layer of synthetic rubber, and the inner layer has a lower elastic modulus, both layers exhibit similar stretching characteristics, and stretch uniformly along with the base fabric. Consequently, the wetsuit material stretches as if it were composed of a single layer of synthetic rubber.

Other objects, details and advantages of the invention will be apparent from the following detailed description when read in conjunction with the drawings.

DETAILED DESCRIPTION OF THE PREFERRED EMBODIMENT

Figure 1:
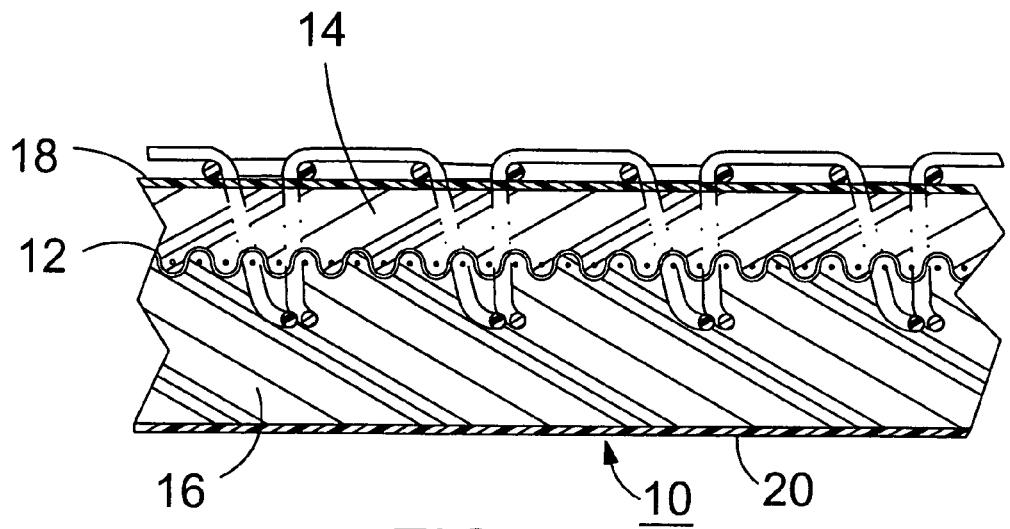
FIG. 1 is a fragmentary, schematic, sectional view showing the construction of the wetsuit material in accordance with the invention.

As shown in FIG. 1, the wetsuit material 10 comprises three principal layers: a base fabric 12, an outer neoprene layer 14, and an inner neoprene layer 16.

The base fabric is preferably a nylon/lycra, high stretch fabric, similar to the fabrics used on the exterior of conventional wetsuits. The fabric should have a four-way stretch capability in the range of 200% to 250%. The degree of stretchability of the base fabric should match the stretchability of the neoprene layers. The fabric weight is preferably 6 ounces per yard (of 60 inch wide fabric). A knit or woven base layer fabric can be used.

The neoprene layers 14 and 16 are both preferably a closed-cell, foam neoprene. However, the layer 14 is denser, and tougher, than the layer 16. The less dense layer 16, on the other hand, is thicker than layer 14, and contributes more to the warmth of the wetsuit. These layers are secured to the opposite sides of the base fabric 12 by thin layers of high temperature chloroprene adhesive. The adhesive layers should be a thin as possible in order not to interfere with the stretchability of the wetsuit material, and in order to avoid separation of the synthetic rubber layers from the base fabric, which can occur if excessive amounts of adhesive are used.

Because of its greater density, the outer layer 14 has an elastic modulus greater than that of the inner layer 16. To compensate for the greater elastic modulus of the outer layer 14, the outer layer is made less thick than the inner layer 16, and consequently, the base fabric 12 is close to the outer surface of the material than to the inner surface. Preferably, the ratio of the thicknesses of the inner and outer layers is approximately the inverse of the ratio of their elastic moduli. As a result, the layers exhibit similar stretch characteristic, and stretch uniformly, neither layer interfering with the stretching of the other layer.

Typically, the outer layer 14 is from 1.0 to 2.5 mm thick, and the inner layer is from 2.0 to 4.0 mm thick. In a material having a total thickness of 3.0 mm, typical thicknesses of layers 14 and 16 are 1.0 and 2.0 mm, respectively. In a material having a total thickness of 5.0 mm, typical thicknesses of layers 14 and 16 are 1.5 and 3.5 mm, respectively. In a material having a total thickness of 6.5 mm, typical thicknesses of layers 14 and 16 are 2.5 and 4.0 mm, respectively.

The outer face of layer 14 is preferably provided with hydrophobic coating 18, composed primarily of cured, high temperature chloroprene adhesive. This layer can include a dye to color the exterior of the wetsuit, and accordingly, if desired, different panels of the wetsuit can have different colors. To avoid interference with the stretching characteristics of the wetsuit material, and so that it stretches compatibly with layer 14, the coating 18 should be very thin, not more than about 10 microns in thickness, and preferably about 5 microns in thickness. Other hydrophobic coatings, such as polyurethane, can be used.

The outer face of layer 14 is textured with an embossed mesh pattern to lend some friction to the surface so that it is not excessively slippery. This allows the wetsuit to be handled more easily when out of the water, reduces the likelihood of a diver's slipping when seated, and facilitates attachment of diving gear to the wetsuit.

The inner face of layer 16 is also preferably provided with a hydrophobic, anti-microbial coating 20, which provides a low-friction surface. This coating 20, which comes into direct contact with the diver's skin, is preferably a coating known as an "SCS" coating, available from Yamamoto Corporation, 5-13-11, Nakagawa, Ikuno-Ku, Osaka 544, Japan. The coating is preferably applied in a thickness not exceeding about 10 microns, in order not to impair the stretching characteristics of the wetsuit material.

Figure 2:
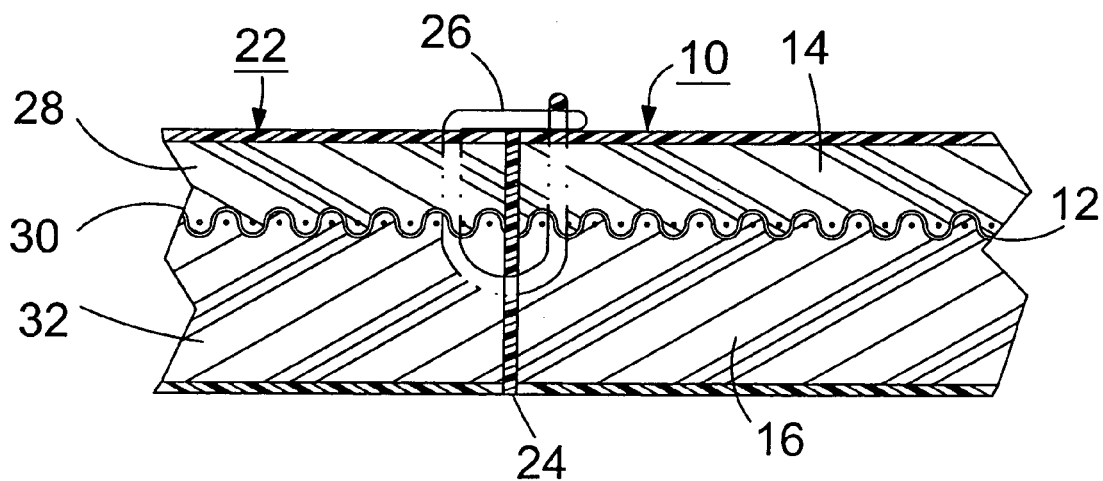
FIG. 2 is a fragmentary, schematic, sectional view showing the manner in which two adjoining panels of wetsuit material in accordance with the invention are secured together in edge-to-edge relationship.

As shown in FIG. 2, two panels, 10 and 22 of wetsuit material are secured in edge-to-edge relationship. The panels are secured together by a layer 24 of high temperature neoprene adhesive, which can be the same adhesive used to secure the neoprene layers to the base fabric. In addition, the panels are sewn together by a thread 26, preferably stitched in a blind, or "bonis," stitch passing over the outer surfaces of both panels, across the interface between the panel edges, from panel 10 to panel 22, then into panel 22, through both the outer neoprene layer 28 and the base fabric 30, and then into the inner layer 32 and across the interface into layer 16 of panel 10, and then through base fabric 12, and layer 10, back to the outer surface of panel 10. The blind stitching is continued as depicted in FIG. 1, the thread never passing through the interior facing surfaces of either of said two adjoining panels 10 and 22.

Figure 3:
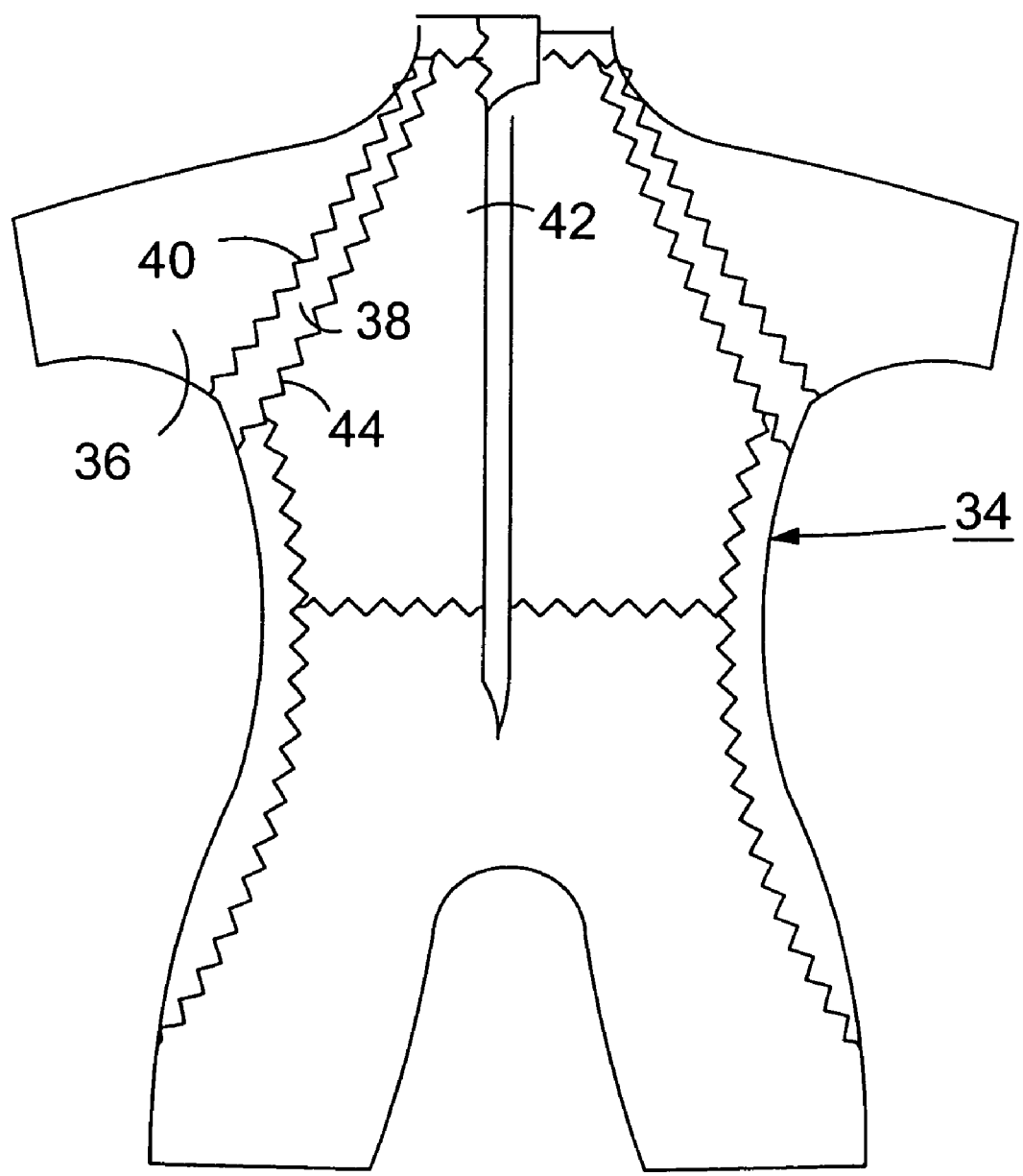
FIG. 3 is a schematic elevational view showing locations of the seams at which adjoining panels are secured together in edge-to-edge relationship in a wetsuit according to the invention.

Panels having the construction shown in FIGS. 1 and 2 may be cut in appropriate shapes and assembled into a wetsuit 34, as shown in FIG. 3. In the wetsuit, panels 36 and 38 are secured together in edge-to-edge relationship at seam 40. Likewise, panels 38 and 42 are secured together in edge-to-edge relationship at seam 44, and so on.

Because it has no absorbent exterior layer, and also because it has hydrophobic exterior and interior surfaces, wetsuit 34 dries much more rapidly than a conventional wetsuit. Consequently, it is unnecessary to dry the wetsuit in the sun risking damage from ultraviolet radiation, or to attempt to machine-dry the wetsuit and risk damage due to prolonged exposure to excessive temperature. The wetsuit can also be packed almost immediately after use, and consequently the problem of waiting for the suit to dry is minimized, and the risk of theft is reduced. Moreover, since the fabric layer is sandwiched between layers of neoprene, the problems of pilling of the fabric, and damage to the fabric due to abrasion and other causes, are avoided.

Although the neoprene is not protected by an exterior fabric layer as in a conventional wetsuit, adequate protection against damage due to abrasion is afforded by the toughness of the dense outer layer of neoprene, while the less dense inner layer contributes to the warmth of the wetsuit. Because the outer layer of synthetic rubber is thinner than the inner layer of synthetic rubber, and the inner layer has a lower elastic modulus, both layers exhibit similar stretching characteristics, and the wetsuit material stretches as if it were composed of a single layer of synthetic rubber.

Various modifications can be made to the wetsuit and wetsuit fabric of the invention. For example, multiple layers of base fabric can be incorporated into the material, and may be spaced from one another by additional layers of foamed neoprene. Moreover, although a blind stitch is preferred for securing the adjoining panels in edge-to-edge relationship because it allows the interior surface of the wetsuit to remain as smooth as possible, the panels can be secured together by stitching which passes all the way through the inner and outer synthetic rubber layers, in which case, it is desirable to cover the inner portion of the seam with a suitable sheet-like strip.

Still other modifications may be made to the apparatus and method described above without departing from the scope of the invention as defined in the following claims.

What is claimed is:

1. A wetsuit material comprising a base fabric sandwiched between first and second layers of synthetic rubber, each of said first and second layers having a substantially uniform thickness, the first layer having an elastic modulus and density greater than the elastic modulus and density, respectively, of the second layer, and the first layer being thinner than the second layer, in which the ratio of the thicknesses of the first and second layers is approximately the inverse of the ratio of their elastic moduli, whereby both synthetic rubber layers of the wetsuit material stretch uniformly.

2. A wetsuit material according to claim 1, in which said first layer has an inner face adhesively secured to said base fabric, and an outer face coated with a hydrophobic layer of cured chloroprene adhesive.

3. A wetsuit material comprising a base fabric sandwiched between first and second layers of synthetic rubber, each of said first and second layers having a substantially uniform thickness, the first layer having an elastic modulus and density greater than the elastic modulus and density, respectively, of the second layer, and the first layer being thinner than the second layer, in which said first layer has an inner face adhesively secured to said base fabric, and an outer face coated with a hydrophobic layer of cured chloroprene adhesive, said hydrophobic layer having a thickness not greater than approximately 10 microns.

4. A wetsuit material according to claim 3, in which said hydrophobic layer has a thickness of approximately 5 microns.

5. A wetsuit material comprising a base fabric sandwiched between first and second layers of synthetic rubber, each of said first and second layers having a substantially uniform thickness, the first layer having an elastic modulus and density greater than the elastic modulus and density, respectively, of the second layer, and the first layer being thinner than the second layer, in which said first layer has an inner face adhesively secured to said base fabric and an outer face embossed with a pattern, whereby friction of said outer face is increased.

6. A wetsuit material according to claim 5, in which said pattern with which said outer face is embossed is a mesh pattern.

7. A wetsuit comprising multiple panels sewn together in edge-to-edge relationship, each panel comprising a base fabric having exterior and interior sides facing respectively toward the exterior and interior of the wetsuit, and first and second layers of synthetic rubber, the base fabric being sandwiched between said first and second layers, the first layer being disposed on the exterior side of the base fabric, and the second layer being disposed on the interior side of the base fabric, each of said first and second layers having a substantially uniform thickness, and the first layer having an elastic modulus and density greater than the elastic modulus and density, respectively, of the second layer, and the first layer being thinner than the second layer, in which the ratio of the thicknesses of the first and second layers is approximately the inverse of the ratio of their elastic moduli, whereby both synthetic rubber layers of the wetsuit material stretch uniformly.

8. A wetsuit comprising multiple panels sewn together in edge-to-edge relationship, each panel comprising a base fabric having exterior and interior sides facing respectively toward the exterior and interior of the wetsuit, and first and second layers of synthetic rubber, the base fabric being sandwiched between said first and second layers, the first layer being disposed on the exterior side of the base fabric, and the second layer being disposed on the interior side of the base fabric, each of said first and second layers having a substantially uniform thickness, and the first layer having an elastic modulus and density greater than the elastic modulus and density, respectively, of the second layer, and the first layer being thinner than the second layer, in which said first layer has an inner face adhesively secured to said base fabric, and an outer face coated with a hydrophobic layer of cured chloroprene adhesive, said hydrophobic layer having a thickness not greater than approximately 10 microns.

9. A wetsuit according to claim 8, in which said hydrophobic layer has a thickness of approximately 5 microns.

10. A wetsuit comprising multiple panels sewn together in edgetoedge relationship, each panel comprising a base fabric having exterior and interior sides facing respectively toward the exterior and interior of the wetsuit, and first and second layers of synthetic rubber, the base fabric being sandwiched between said first and second layers, the first layer being disposed on the exterior side of the base fabric, and the second layer being disposed on the interior side of the base fabric, each of said first and second layers having a substantially uniform thickness, and the first layer having an elastic modulus and density greater than the elastic modulus and density, respectively, of the second layer, and the first layer being thinner than the second layer, in which said first layer has an inner face adhesively secured to said base fabric and an outer face embossed with a pattern, whereby friction of said outer face is increased.

11. A wetsuit material according to claim 10, in which said pattern with which said outer face is embossed is a mesh pattern.

12. A wetsuit comprising multiple panels sewn together in edge-to-edge relationship, each panel comprising a base fabric having exterior and interior sides facing respectively toward the exterior and interior of the wetsuit, and first and second layers of synthetic rubber, the base fabric being sandwiched between said first and second layers, the first layer being disposed on the exterior side of the base fabric, and the second layer being disposed on the interior side of the base fabric, each of said first and second layers having a substantially uniform thickness, and the first layer having an elastic modulus and density greater than the elastic modulus and density, respectively, of the second layer, and the first layer being thinner than the second layer, in which the base fabric has interior and exterior sides, in which one of said two layers of synthetic rubber is an outer layer disposed on the exterior side of the base fabric and having an exterior-facing outer surface, and the other of said two layers of synthetic rubber is an inner layer disposed on the interior side of the base fabric and having an interior-facing surface, in which adjoining panels are sewn together in edge-to-edge relationship by blind-stitched threads passing over the outer surfaces of adjoining panels and across the adjoining edges thereof, then through the outer layer and base fabric of one of the panels into the inner layer of said one of said adjoining panels, then into the inner layer in the other of said adjoining panels, and through the base fabric and outer layer of said other of said two adjoining panels, without passing through the interior facing surfaces of either of said two adjoining panels.

13. A wetsuit comprising multiple panels sewn together in edge-to-edge relationship and formed to fit the torso, and at least parts of the arms or legs, of a diver, said wetsuit having an interior side adapted to contact the body of a diver, and an exterior side, each of said panels comprising a stretchable base fabric sandwiched between first and second layers of synthetic rubber foam, the first layer of each panel being on the exterior side of the wetsuit, and the second layer of each panel being on the interior side of the wetsuit, each of said first and second layers having a substantially uniform thickness, in which said second layer of synthetic rubber foam has a face adhesively secured to said base fabric, and an opposite face forming a nart of the interior side of the wetsuit, said opposite face being coated with a coating that reduces the friction between said opposite face and the diver's skin.

14. A wetsuit according to claim 13, in which the first layer of each of said panels has a face adhesively secured to said base fabric, and an outer face forming a part of the exterior side of the wetsuit, said outer face having a hydrophobic coating, said hydrophobic coating having a thickness not greater than approximately 10 microns.

15. A wetsuit according to claim 14, in which said hydrophobic coating has a thickness of approximately 5 microns.

16. A wetsuit according to claim 13, in which said coating on said opposite face of the second layer of synthetic rubber foam is a hydrophobic coating.

17. A wetsuit according to claim 13, in which said coating on said opposite face of the second layer of synthetic rubber foam has a thickness not greater than about 10 microns.

18. A wetsuit according to claim 13, in which said first layer of synthetic foam material has a density greater than the density of said second layer of synthetic foam material.

19. A wetsuit according to claim 18, in which said second layer of synthetic foam material has a thickness greater than the thickness of said first layer of synthetic foam material.

20. A wetsuit according to claim 13, in which the coated outer face of said first layer of synthetic foam material is embossed with a pattern, whereby friction of said outer face is increased.

21. A wetsuit according to claim 13, in which the coated outer face of said first layer of synthetic foam material is embossed with a mesh pattern, whereby friction of said outer face is increased.

* * * * *

UNITED STATES PATENT AND TRADEMARK OFFICE
CERTIFICATE OF CORRECTION

PATENT NO. : 7,051,375 B2  Page 1 of 1
APPLICATION NO. : 10/953331
DATED : May 30, 2006
INVENTOR(S) : Joseph P. Polak et al.

It is certified that error appears in the above-identified patent and that said Letters Patent is hereby corrected as shown below:

column 5, line 24, "chioroprene" should read --chloroprene--;

column 7, line 6, "nart" should read --part--.

Signed and Sealed this

Twenty-second Day of August, 2006

JON W. DUDAS
*Director of the United States Patent and Trademark Office*